Nov. 7, 1961 H. A. TOULMIN, JR Re. 25,076

GRINDING DRUM

Original Filed March 2, 1954 2 Sheets-Sheet 1

INVENTOR.
HARRY A. TOULMIN, JR.
BY Toulmin & Toulmin
ATTORNEYS

GRINDING DRUM

Original Filed March 2, 1954 2 Sheets-Sheet 2

INVENTOR.
HARRY A. TOULMIN, JR
BY Toulmin & Toulmin
ATTORNEYS

United States Patent Office

Re. 25,076
Reissued Nov. 7, 1961

25,076

GRINDING DRUM

Harry A. Toulmin, Jr., Dayton, Ohio, assignor, by mesne assignments, to The Commonwealth Engineering Company of Ohio, Dayton, Ohio, a corporation of Ohio Original No. 2,745,223, dated May 15, 1956, Ser. No. 413,613, Mar. 2, 1954. Application for reissue May 1, 1959, Ser. No. 810,517
4 Claims. (Cl. 51—190)

Matter enclosed in heavy brackets [ ] appears in the original patent but forms no part of this reissue specification; matter printed in italics indicates the additions made by reissue.

The present invention relates to an abrasive strip and the method of making the same, more particularly to a replaceable abrasive strip which is detachably mounted upon a light-weight frame to form a light-weight grinding wheel.

In industry the grinding of a surface in order to achieve a desired finish is a very common operation. The conventional grinding operation is accomplished by using a vitrified grinding wheel. This is a solid heavy wheel wherein a suitable binder serves to hold together a quantity of abrasive materials in the form of a wheel. Another form of grinding wheel which is commonly used is comprised of rubber with abrasive materials such as garnets or the like interspersed in the rubber. Because of their solid construction, both types of wheels are heavy. Because of their weight certain problems are introduced in the construction of the grinding machine.

In order to suitably support a vitrified grinding wheel, a heavy arbor or disc wheel, or some other means of support, must be used. Consequently, the total weight of the grinding wheel plus the arbor will comprise a considerable portion of the entire weight of the grinding machine.

In addition, heavy bearings must be employed so that the grinding wheel shaft may be accurately rotated therein. For certain sizes of grinding wheels is is necessary that bearings be employed to support both ends of the grinding wheel shaft. The size of the bearings is also dictated by the fact that a heavy grinding wheel will induce a gyroscopic action in the grinding wheel shaft. Consequently it can be seen that important economies can be achieved if the weight of the grinding wheel itself can be reduced.

The present invention discloses a light-weight grinding wheel which will eliminate the problems and disadvantages of conventional grinding wheels as stated above. The grinding wheel disclosed in this invention essentially comprises a flexible abrasive band which is suitably mounted upon a spider formed of a light-weight metal. The abrasive band is made by coating a fabric-like strip with a plastic material which has a high temperature resistance. The abrasive particles are carried by the plastic coating and are arranged so that they are aligned vertically on the surface of the abrasive band. The abrasive band can be made in either a strip or in the form of a sleeve. This sleeve may then be cut into sleeves of appropriate widths.

This invention further discloses the method of making an abrasive band employed in the grinding wheel disclosed in this invention. When following the teachings of this invention, an extremely light-weight abrasive band is obtained. When this band is mounted upon an aluminum cylinder which is in turn supported by an expansible frame, it can be seen that an extremely light-weight grinding wheel is obtained. The use of this light-weight grinding wheel eliminates the need for heavy supporting structure. This includes an arbor, shaft, and supporting bearings. In addition, as this grinding wheel is considerably lighter than the conventional vitrified grinding wheel it would not be necessary to use bearings to support the grinding wheel shaft on both sides of the grinding wheel. However, it is pointed out that if a grinding wheel of extreme width is used, it may be necessary to support both ends of the shaft by bearings. These bearings, however, will be light in construction and hence will be inexpensive.

The process by which the abrasive band disclosed in this invention is made is extremely simple and inexpensive. It is desired to make this process inexpensive so that the abrasive bands may be expendable. Consequently, when it is necessary to renew the grinding surface of the grinding wheel of this invention, it is necessary only to replace the abrasive band. The abrasive band is detachably mounted upon the frame of the grinding wheel. Consequently, renewing abrasive bands may be quickly and easily accomplished. Thus it can be seen that it is not necessary to replace the entire grinding wheel but merely to renew the abrasive band. As abrasive bands are inexpensive, and may be quickly replaced, it can be seen that considerable economies may be achieved by the use of these replaceable bands.

If desired, means may be easily provided for the cooling of the grinding wheel when in use. An embodiment of this invention discloses an aluminum frame wherein a number of grooves are made in the surface of the supporting cylinder. Consequently, the coolant which would be circulated through these grooves will be between the abrasive band and the aluminum cylinder.

The abrasive band disclosed in this invention is not limited to industrial operations. The field of low-pressure grinding of precious and semi-precious metals is especially suited for the employment of this invention.

It can therefore be seen that this invention will provide for considerable economies in both weight and cost of grinding equipment.

It is therefore the object of this invention to provide an inexpensive, light-weight grinding wheel.

It is another object of this invention to provide a grinding wheel in which the grinding element is a detachably-mounted, replaceable abrasive band.

It is still another object of this invention to provide a grinding wheel having a light-weight, expansible supporting frame which carries a detachably-mounted, replaceable abrasive band.

It is yet another object of this invention to provide an inexpensive abrasive band.

It is a further object of this invention to provide an abrasive band comprising a fabric-like base upon which are placed plastic coatings to carry a plurality of vertically aligned abrasive particles.

It is a still further object of this invention to provide a flexible abrasive band in which the abrasive particles are mounted in plastic coatings.

It is an additional object of this invention to provide a method of making an inexpensive abrasive band which may be readily mounted and replaced upon a grinding wheel frame.

It is yet a further object of this invention to provide a method of making an abrasive band wherein a plurality of vertically-aligned abrasive particles are carried in plastic layers coated upon a fabric-like base.

Other objects and advantages of this invention will become readily apparent when reference is made to the accompanying description when taken in conjunction with the following drawings, wherein.

Figure 8:
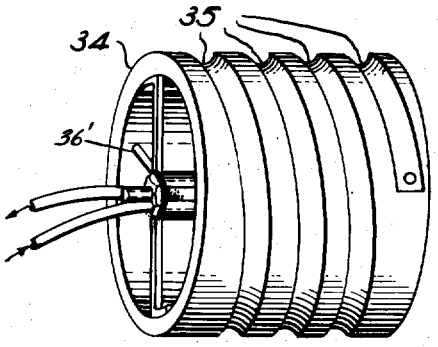
Figure 7:
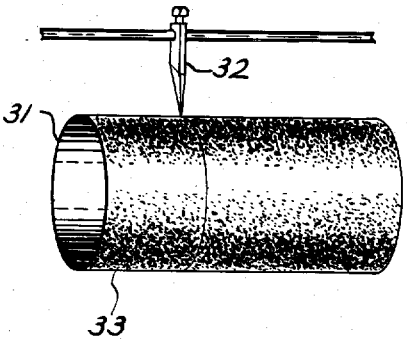

FIGURE 7 is a perspective view of an abrasive band made in the form of a sleeve, and showing the manner in which this sleeve may be cut to form sleeves of desired widths; and FIGURE 8 is a perspective view illustrating another embodiment of the supporting frame for the grinding wheel of this invention, wherein grooves are provided to circulate a coolant between the abrasive band and the supporting cylinder.

Returning now to FIGURE 1, wherein like reference characters indicate the same parts throughout the various views, 10 indicates generally a grinding wheel constructed in accordance with this invention. The grinding wheel 10 comprises a supporting cylinder 11 which has a longitudinally-extending slit 12 in the wall thereof. The supporting cylinder 11 is preferably made of a light-weight metal such as aluminum. An abrasive band 13 is detachably mounted around the supporting cylinder 11. The abrasive band 13 will later be described in considerable detail. A suitable expansible frame 14 is positioned within the supporting cylinder 11 so that the supporting cylinder 11 is mounted upon the expansible frame 14. The expansible frame 14 is adapted to be rotatably mounted upon a grinding wheel shaft 15. It is preferable that the expansible frame 14 be also made of a light-weight metal, such as aluminum or the like. The expansible frame 14 may be of a type wherein legs are threadedly received within the spokes of the frame and a nut engages the threaded portion of each leg to vary the expansion of the frame. It is pointed out that there are several suitable expansible frames or spiders on the market, any of which may be used to support the cylinder 11.

Figure 2:
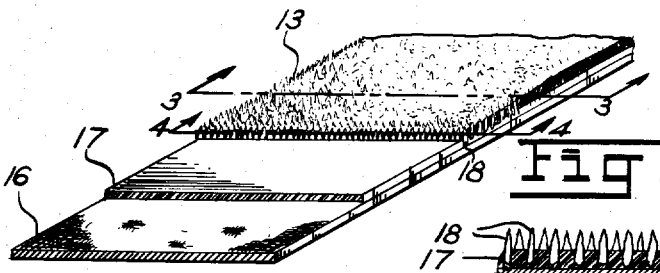
FIGURE 2 is a perspective view of an abrasive band made in accordance with this invention with succeeding portions of the plastic coatings cut away in order to illustrate the invention in greater detail.

Proceeding now to FIGURE 2, there is illustrated therein the abrasive band 13 with portions of the band cut away. It is to be understood that the vertical dimensions of the band as illustrated in FIGURE 2 are greatly exaggerated so that the structure of the band may be clearly shown.

The abrasive band 13 comprises a flexible base 16 made of a fabric-like material. The flexible base 16 is preferably a band of glass fibers. However, it is to be understood that other material may be readily used in place of glass fibers. Materials such as asbestos, mineral and rock wool, and high-temperature and high abrasive bands of nylon or Dacron may be satisfactorily utilized.

Figures 3, 4:
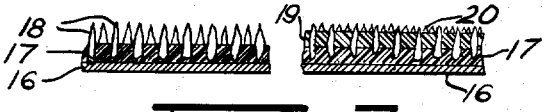
FIGURE 3 is a sectional view taken along the line 3—3 in FIGURE 2.
FIGURE 4 is a sectional view taken along the line 4—4 of FIGURE 2.

A layer of plastic material 17 is coated on the flexible base 16. The plastic layer 17 is preferably composed of a tough, flexible, and soft resin. Other materials which may be satisfactorily employed are rubber, synthetic rubber, or polyvinyl acetate. The plastic layer 17 is a non-wearing coat. The plastic layer 17 primarily serves as a base for a plurality of abrasive particles 18, which are secured in vertically upright positions in the plastic layer 17. As shown in FIGURE 4, the plastic layer 17 has a thickness of approximately one-half the length of the abrasive particles 18. A second plastic layer 19 is coated upon the first plastic layer 17. The plastic layer 19 is of such a depth that the abrasive particles 18 are virtually covered. Only the extreme tips 20 of the abrasive particles protrude from the plastic layer 19.

The plastic layer 19 is a wearing coating. Consequently, it is preferable that the plastic layer 19 be formed of a hard resin. Rosin, or rosin modified, would also be suitable for use as the plastic layer 19. Other materials such as phenol formaldehyde and urea formaldehyde would also be suitable for use as the second plastic layer 19. It should also be borne in mind that heat-resistant silicon resins could also be satisfactorily employed.

As may be seen from FIGURES 3 and 4, abrasive particles 18 are elongated in shape. These elongated abrasive particles may be composed of "Carborundum," diamond dust, or any other suitable abrasive depending upon the specific use to which it is desired to put a particular grinding wheel. With this structure of an abrasive band, it can be seen that as the band is being used the abrasive particles 18 together with the second plastic layer 19 will gradually wear away. As the second plastic layer 19 is considerably softer than the abrasive particles, the plastic layer will wear before the abrasive particles. Consequently, the extreme portions of the abrasive particles 18 will continuously project above the surface of the second plastic layer 19. When the second plastic layer 19 has completely worn away, as indicated by the appearance of the first plastic layer, then the abrasive band may be readily replaced by another band.

Figure 5:
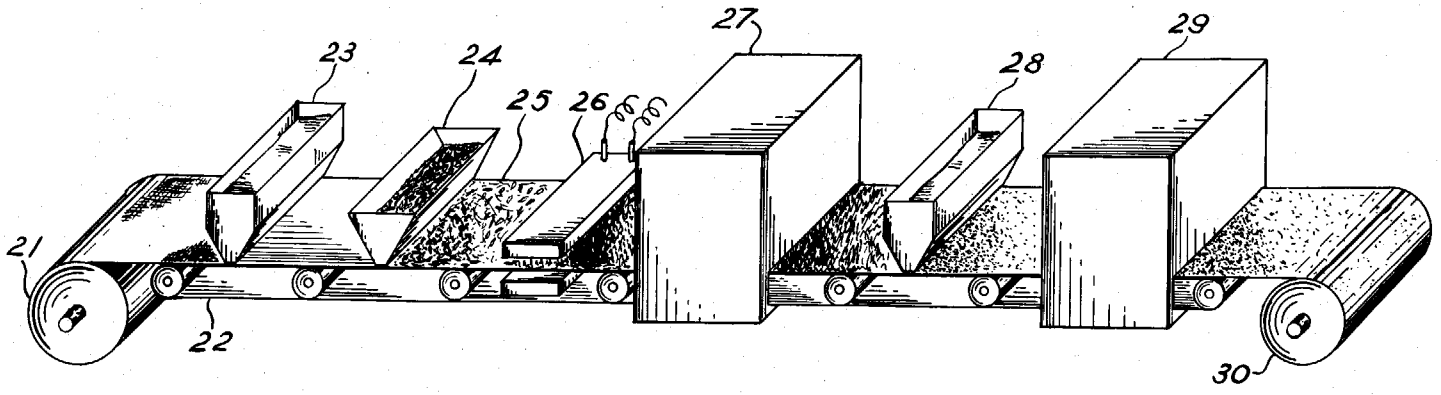
FIGURE 5 is a schematic perspective view of the apparatus used in making the abrasive bands disclosed in this invention.

Proceeding now to FIGURE 5, there is illustrated schematically therein the apparatus used for manufacturing the abrasive band 13. The material which is to form the flexible base 16 is unwound from a roll 21 and placed upon a conveyor belt 22. The flexible base 16 first passes beneath a container 23 which holds a quantity of plastic material. This plastic material is coated upon the flexible base 16 to form a first plastic layer 17. The plastic material also impregnates the flexible base 16. By the impregnation of the flexible base 16 with this plastic the strength properties of the flexible base 16 are greatly increased.

The plastic coated flexible base then passes beneath a hopper 24 which contains the elongated abrasive particles 18. The abrasive particles 18 are uniformly scattered upon the plastic coated flexible base. As shown at 25, the positions of the abrasive particles are not uniform. Consequently the flexible base 16 proceeds through a strong magnetic field induced by the apparatus 26. The strong magnetic field set up by the apparatus 26 serves to align the elongated abrasive particles into upright positions. With the abrasive particles in upright positions, the flexible base is then passed into a heat treatment apparatus 27. The plastic coated flexible base is then baked in the heat treatment apparatus 27 to harden the plastic coating. The plastic layer 17 is preferably converted into a thermo-setting plastic so that it will be better able to resist high temperatures.

It is pointed out that under some conditions it may be necessary to extend the magnetic apparatus 26 into the heat treatment apparatus 27. Some heat-treating operations may also require that the magnetic field be continuously passed through the abrasive particles while they are in the heat treating apparatus 27. This will also insure that the abrasive particles will be secured in upright positions when they emerge from the heat treatment apparatus.

Upon emerging from the heat treatment apparatus 27, the flexible base 16, which now has a plastic layer 17 together with vertically upright abrasive particles 18 secured therein, is passed beneath a container 28. The container 28 holds a plastic material which is to form the second plastic layer 19. As indicated above, this plastic material is preferably a hard resin. The plastic material in the container 28 is spread over the flexible base 16 to such a depth that only the extreme tips 20 of the abrasive particles 18 protrude above the surface of the second plastic layer 19. After this second plastic layer 19 has been applied, the flexible base is then conveyed through a second heat treatment apparatus 29. In the heat treatment apparatus 29 the plastic which was applied from the container 28 is hardened and formed into a thermosetting plastic so that it may be able to resist the high temperatures and heavy abrasion. Upon emerging from the heat treatment apparatus 29, the process of manufacturing the abrasive band 13 has been completed. The completed abrasive band 13 is then wound about a suitable drum indicated at 30.

Figure 1:
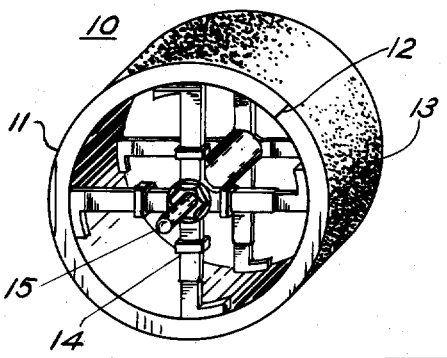
FIGURE 1 is a perspective view of a light-weight grinding wheel constructed in accordance with this invention.

It is to be noted that the abrasive band as made in the manner previously described emerges in the form of a strip. The strip may be cut to desired widths and suitably attached to the supporting cylinder 11 illustrated in FIGURE 6. Any suitable adhesive material or cement may be used to secure the abrasive band to the supporting cylinder 11. It is pointed out that either the manufacturer or the ultimate user of the abrasive band may mount the abrasive bands upon the supporting cylinders 11. In the former event the ultimate user will obtain an assembled grinding wheel as illustrated in FIGURE 1, whereas in the latter event the user procures the abrasive band in strip form and mounts the band on the job site. The course to be followed will usually be determined by the economies involved.

It is also possible to manufacture the abrasive band 13 in the form of a sleeve. When manufactured in the form of a sleeve, the same apparatus as illustrated in FIGURE 5 is used, but is arranged in a somewhat different manner. The ultimate arrangement of the apparatus will depend largely upon the diameter of the sleeve of the abrasive material. In this process, the flexible base 16 is made in the form of a sleeve, and the various components of the abrasive band are then successively applied to the sleeve-like flexible base substantially in the manner described above.

When the abrasive band is made in the form of a sleeve, the sleeve may then be cut to desired widths. This is indicated in FIGURE 7, wherein a sleeve-like abrasive band 31 is being cut by a cutting tool 32 into a desired width. This cutting process may be either carried out at the site of manufacture of the abrasive band, or the ultimate user of the abrasive band may obtain the abrasive bands in sleeve form and then cut them down to his required widths.

Figure 6:
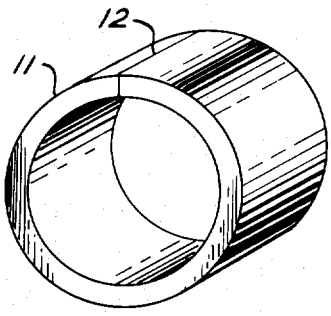
FIGURE 6 is a perspective view of the supporting cylinder employed in the grinding wheel disclosed in this invention.

After the sleeve-like abrasive band 31 has been reduced to the required width, the reduced section indicated as 33 in FIGURE 7 is then placed upon a supporting cylinder 11 indicated in FIGURE 6. The supporting cylinder 11 is then mounted upon an expansible frame 14. The expansible frame 14 is then expanded so as to slightly increase the diameter of the supporting cylinder 11. This increase in diameter of the supporting cylinder 11 will cause the abrasive band positioned thereon to be tightened in place. A suitable adhesive or cement material may be used to additionally secure the abrasive band to the supporting cylinder.

In some grinding operations it may be desirable to further cool the grinding wheel when in operation. One manner in which this may be done is by circulating a coolant between the abrasive band 13 and the supporting cylinder 11. To this end a modified supporting cylinder 34, as illustrated in FIGURE 8, may be used. The modified supporting cylinder 34 has a helical or a continuous groove 35 cut in its outer cylindrical surface. A suitable coolant is then circulated through the helical groove 35. The coolant may be conveyed through the helical groove 35 in any one of several different ways. As an example which is indicated in the drawings, the hub of the expansible frame 14 is made hollow and is secured upon a hollow shaft which is suitably journaled. A suitable tubelike member could then connect the hub of the expansible frame with the helical groove 35. A second tubelike member is used for the return of the coolant from the helical groove to the hollow shaft. A pump is used to maintain circulation of the coolant which may be a liquid.

Thus it can be seen that this invention provides an improved form of an abrasive band. It is pointed out that by slight modifications in the above-described process it is possible to obtain an abrasive band which may be used to cut various shapes. To do this, the flexible base 13 should be made of glass fibers which would be molded into a desired shape. Consequently when the resins and abrasive particles are applied to this molded glass fiber base, it may be seen that an abrasive band is obtained which has a transverse configuration other than that of the conventional flat abrasive strip. Consequently this invention provides not only an abrasive band which may be rapidly changed on a grinding wheel frame, but also an abrasive band which may be used to grind various shapes.

It will be understood that this invention is susceptible to modification in order to adapt it to different usages and conditions, and accordingly it is desired to comprehend such modifications within this invention as may fall within the scope of the appended claims.

What I claim is:

1. A grinding wheel comprising a resilient metallic supporting cylinder, an expansible supporting frame positioned within said cylinder, an abrasive band mounted upon the outer surface of said cylinder, and continuous grooved means on said cylinder for circulating a coolant between said cylinder and said band.

2. In combination, a metallic supporting cylinder, an expansible frame positioned within said cylinder, a replaceable abrasive band detachably mounted around the outer surface of said cylinder, and continuous grooved means on said cylinder between said cylinder and said abrasive band for cooling said abrasive band.

3. A grinding wheel comprising a supporting cylinder, an expansible supporting frame positioned within said cylinder, an abrasive band mounted upon said cylinder, a continuous groove on the outer surface of said cylinder, and means for circulating a coolant fluid through said groove.

*4. A grinding wheel comprising a supporting cylinder, an expansible supporting frame positioned within said cylinder, a flexible sheet mounted upon said cylinder, an abrasive binder coat adhered to one face of said sheet, a layer of elongated abrasive particles embedded in said binder coat and adherently attached thereto such that substantially all of said abrasive particles are uniformly scattered upon the binder coat of said flexible sheet said particles being oriented with the long axes thereof substantially normal to said backing sheet, a continuous groove on the outer surface of said cylinder, and means for circulating a coolant fluid through said groove.*

References Cited in the file of this patent or the original patent

UNITED STATES PATENTS

| | | |
|---|---|---|
| 170,178 | Locke | Nov. 23, 1875 |
| 238,284 | Hapgood | Mar. 1, 1881 |
| 282,509 | Fearey | Aug. 7, 1883 |
| 285,559 | Bishop | Sept. 25, 1883 |
| 426,862 | Ross | Apr. 29, 1890 |

(Other references on following page)

UNITED STATES PATENTS

| | | |
|---|---|---|
| 574,763 | Rudolph | Jan. 5, 1897 |
| 615,906 | Richardson | Dec. 13, 1898 |
| 675,915 | Woods | June 11, 1901 |
| 688,775 | Fry | Dec. 10, 1901 |
| 698,126 | Miskolczy | Apr. 22, 1902 |
| 1,208,501 | Crocker | Dec. 12, 1916 |
| 1,788,600 | Smyser | Jan. 13, 1931 |
| 1,854,071 | Schacht | Apr. 12, 1932 |
| 1,971,653 | Leroy et al. | Aug. 28, 1934 |
| 2,032,356 | Ellis | Mar. 3, 1936 |
| 2,046,122 | Hunt | June 30, 1936 |
| 2,073,167 | Myers | Mar. 9, 1937 |

| | | |
|---|---|---|
| 2,100,780 | Huhn | Nov. 30, 1937 |
| 2,138,882 | Robie | Dec. 6, 1938 |
| 2,186,001 | Bartling | Jan. 9, 1940 |
| 2,201,195 | Melton et al. | May 21, 1940 |
| 2,284,715 | Benner et al. | June 2, 1942 |
| 2,284,738 | Hurst | June 2, 1942 |
| 2,306,781 | Francis | Dec. 29, 1942 |
| 2,347,662 | Carlton et al. | May 2, 1944 |
| 2,410,536 | Vonnegut | Nov. 5, 1946 |
| 2,519,275 | Mollica | Aug. 15, 1950 |
| 2,539,844 | Kingsbury | Jan. 30, 1951 |
| 2,548,166 | Larson | Apr. 10, 1951 |